United States Patent
Kato et al.

(10) Patent No.: US 6,464,395 B1
(45) Date of Patent: Oct. 15, 2002

(54) PRECISION MOUNTING STRUCTURE FOR INDUSTRIAL EQUIPMENT PARTS

(75) Inventors: Soichiro Kato; Hideyuki Tajimi; Yoshinori Mizumura, all of Maebashi (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/499,641

(22) Filed: Feb. 8, 2000

(30) Foreign Application Priority Data

| Feb. 10, 1999 | (JP) | ............................................ 11-032498 |
| Feb. 18, 1999 | (JP) | ............................................ 11-039726 |
| Nov. 11, 1999 | (JP) | ............................................ 11-320427 |

(51) Int. Cl.⁷ ............................................. F16C 29/06
(52) U.S. Cl. ............................. 384/45; 384/49; 384/50; 411/399
(58) Field of Search ................................. 411/399, 338, 411/339, 386, 366.1; 403/13, 14; 384/45, 49, 59

(56) References Cited

U.S. PATENT DOCUMENTS

| 1,630,875 A | * | 5/1927 | Wagenhorst |
| 2,968,375 A | * | 1/1961 | Avery |
| 3,828,422 A | * | 8/1974 | Schmitt |
| 4,232,497 A | * | 11/1980 | Meschnig |
| 4,553,793 A | * | 11/1985 | Teramachi |
| 4,729,669 A | * | 3/1988 | Walter |
| 4,874,275 A | * | 10/1989 | Gotman |
| 5,099,563 A | * | 3/1992 | Strusch |
| 5,105,240 A | * | 4/1992 | Liebig |
| 5,172,982 A | * | 12/1992 | Komiya |
| 5,540,502 A | | 7/1996 | Shiobara et al. |
| 5,704,749 A | * | 1/1998 | Landgrebe .................. 411/386 |

FOREIGN PATENT DOCUMENTS

GB          2112488      *   7/1983   ............... 411/366.1

* cited by examiner

Primary Examiner—Flemming Saether
(74) Attorney, Agent, or Firm—Miles & Stockbridge P.C.

(57) ABSTRACT

A structure is provided for mounting a member to be fixed, on a stationary member, while always accomplishing high position precision even in such cases of fastening of members that a tightening work of bolt is carried out several times, that the members are fixed after repetition of fine adjustment of the fixing position of the member to be fixed, and so on. A screw hole for fixing according to the present invention is shaped so that on a fixing surface of the stationary member provided with the screw hole a region of an annular recess is continuous from the screw hole and annular in the external edge part of the opening portion of the screw hole, and so that when an inside diameter of the through hole, in the fastened member is $\phi a$ and a nominal diameter of the screw hole is b, a width c of the recess in the radial direction of the screw hole satisfies the relation of $0.5\times(\phi a-b) < c \leq 2.0\times(\phi a-b)$.

10 Claims, 6 Drawing Sheets

PRIOR ART

PRIOR ART

FIG. 10

PRIOR ART

US 6,464,395 B1

PRECISION MOUNTING STRUCTURE FOR INDUSTRIAL EQUIPMENT PARTS

BACKGROUND OF THE INVENTION

1. Field of the Invention

The present invention relates to a mounting structure for mounting a member required to be positioned with high precision, for example, a rail for constituting a linear guide bearing used in industrial equipment, on an upper surface of a base member or the like. More particularly, the invention concerns improvements in screw holes bored in a translation apparatus or a mounting member for the translation apparatus or the like, and in screw holes for fixing thereof bored in a housing of a bearing or the like.

2. Related Background Art

For fastening two members to each other with a bolt or a screw, it is common practice to carry out a work of removing burrs and the like appearing around the screw hole for the bolt or the like to be screwed in. For example, when a prepared hole for formation of the screw hole is bored in a stationary member or the like for a rail in the linear guide bearing to be mounted thereon, small protrusions appear in the periphery of the prepared hole. These protrusions are removed using oil stone or the like.

Figure 9:
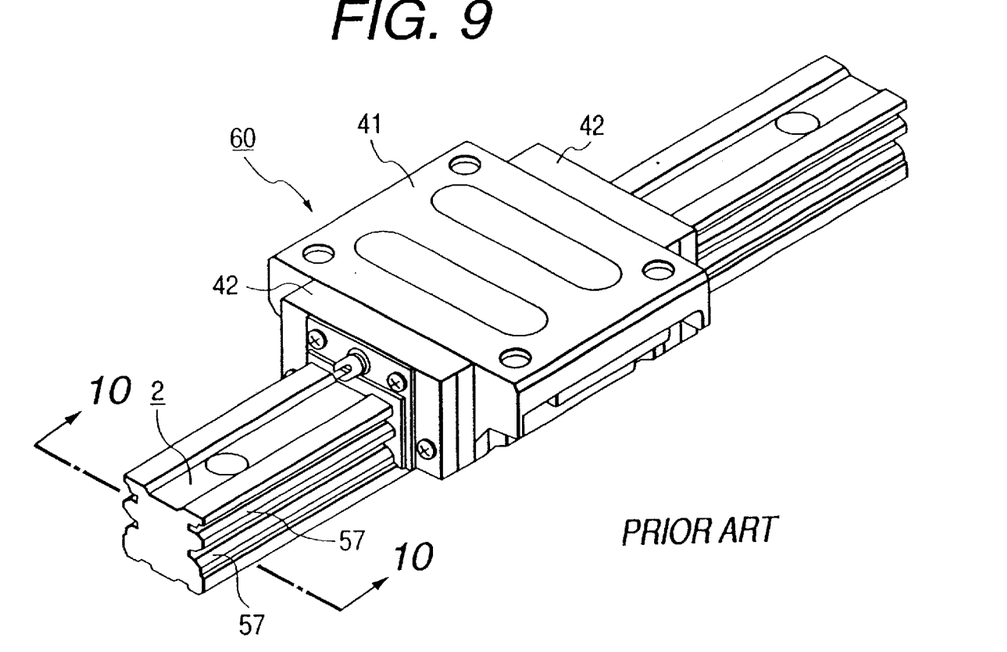
FIG. 9 is a schematic diagram to show the appearance of the linear guide apparatus as a linear guide bearing.
Figure 10:
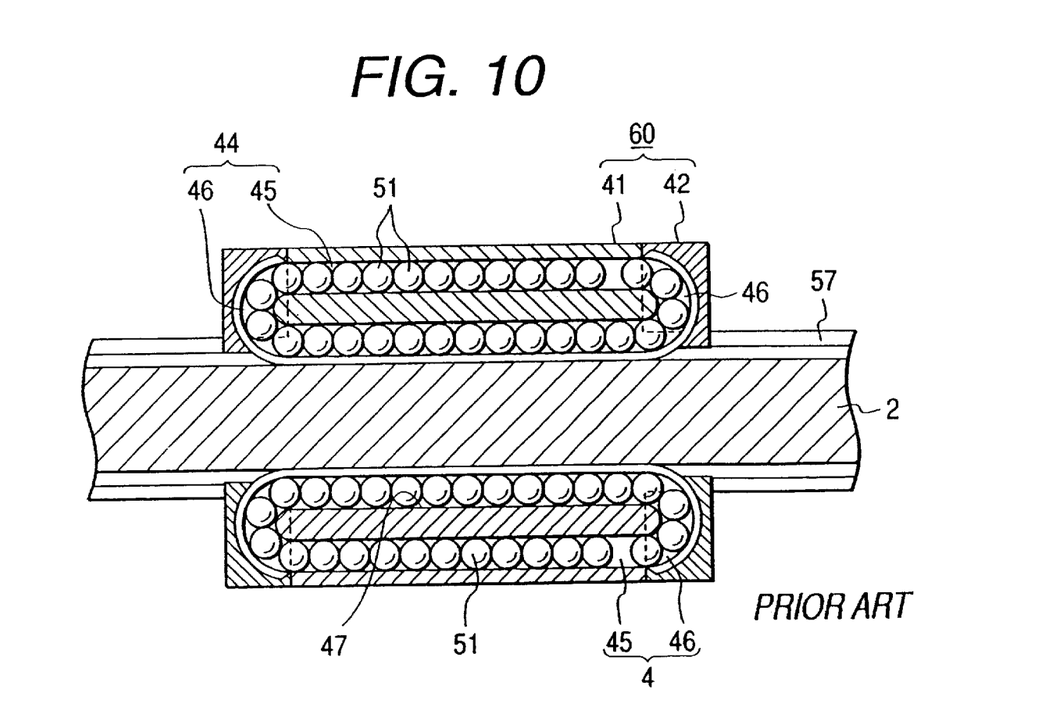
FIG. 10 is a diagram to show the schematic structure in the cross section in the direction of arrows along line 10—10 in FIG. 9, for explaining the structure of the linear guide apparatus.

A specific example will be described based on a case wherein a member to be fixed is the rail for the linear guide bearing and a stationary member is the base member for fixing of the rail and wherein the rail is fastened to the base member with high position precision. FIG. 9 shows the appearance of the linear guide apparatus as a linear guide bearing and FIG. 10 is a cross-sectional view thereof in the direction of arrows along line 10—10 in FIG. 9 to show the internal structure thereof. As illustrated, the linear guide apparatus is comprised of a rail 2 extending in the axial direction and having roller grooves 57 in outside surfaces thereof so as to receive rolling elements or balls 51 in a rotatable state, and a slider 60 having circulation paths 44 for the balls 51 inside and being held so as to be slidable on the rail 2 through the balls 51 in roller grooves 47 opposite to the roller grooves 57. A plurality of balls 51 roll in the circulation paths 44 and between the two roller grooves 57, 47. The slider 60 is composed of a slider body 41 having straight circulation portions 45 of the ball circulation paths 44, and end caps 42 having their respective curved circulation portions 46 to form the ball circulation paths 44 as endless tracks when the end caps 42 are in communication with the straight portions 45 and the spaces between the two roller grooves 57, 47. In the case of the base member to which the rail 2 is fastened, the removing work with the oil stone or the like is normally carried out to remove the protruding portions appearing in the periphery of the holes during boring of the prepared holes before formation of the screw holes for fastening in the base member. After that, the screw holes are formed in the base member, and it is also common practice to carry out the removing work of removing burrs and the like appearing in the periphery of openings of the screw holes during tapping thereof or the like.

The rail is provided with concentric counterbores and pass holes (through holes) for the bolts, which fix the rail to the base, and the inside diameter of the pass holes is greater than the nominal diameter of the screw holes bored in the base. In this structure, the rail is positioned against the base by making use of the difference between the outside diameter of the bolts and the inside diameter of the pass holes, and thereafter the bolts are tightened to fix the rail onto the base.

In cases wherein two or more members are fastened to each other with a bolt or a screw, a specific member is provided with a screw hole, while the other member(s) is provided with a through hole through which the bolt or the like penetrates. The diameter of the through hole is normally set greater than the nominal diameter of the screw hole in order to absorb a positional error of the screw hole or the through hole. When the members are fastened to each other with the bolt or the like through these screw hole and through hole, the screw causes a lifting force toward the through hole to act on the peripheral part of the screw hole. Further, this force is enhanced by the role as a fulcrum of a lever at the peripheral part of the through hole, so as to make a protrusion in the peripheral part of the screw hole (see FIG. 8).

If the fastening work is carried out only once and if the members will never be unfastened, the existence of this protrusion will pose no problem at all. However, if the fastening work is carried out repeatedly using this screw hole, there will arise problems because of this protrusion, such as the problem that the member cannot be fixed at the same position, the problem that joint surfaces of the members cannot fit closely, or the like. Therefore, when high precision is required in the fastening work, it is essential to remove such protrusions. Thus the removing work was always carried out even if it took a considerable time. This will be explained with a specific example.

Figure 7:
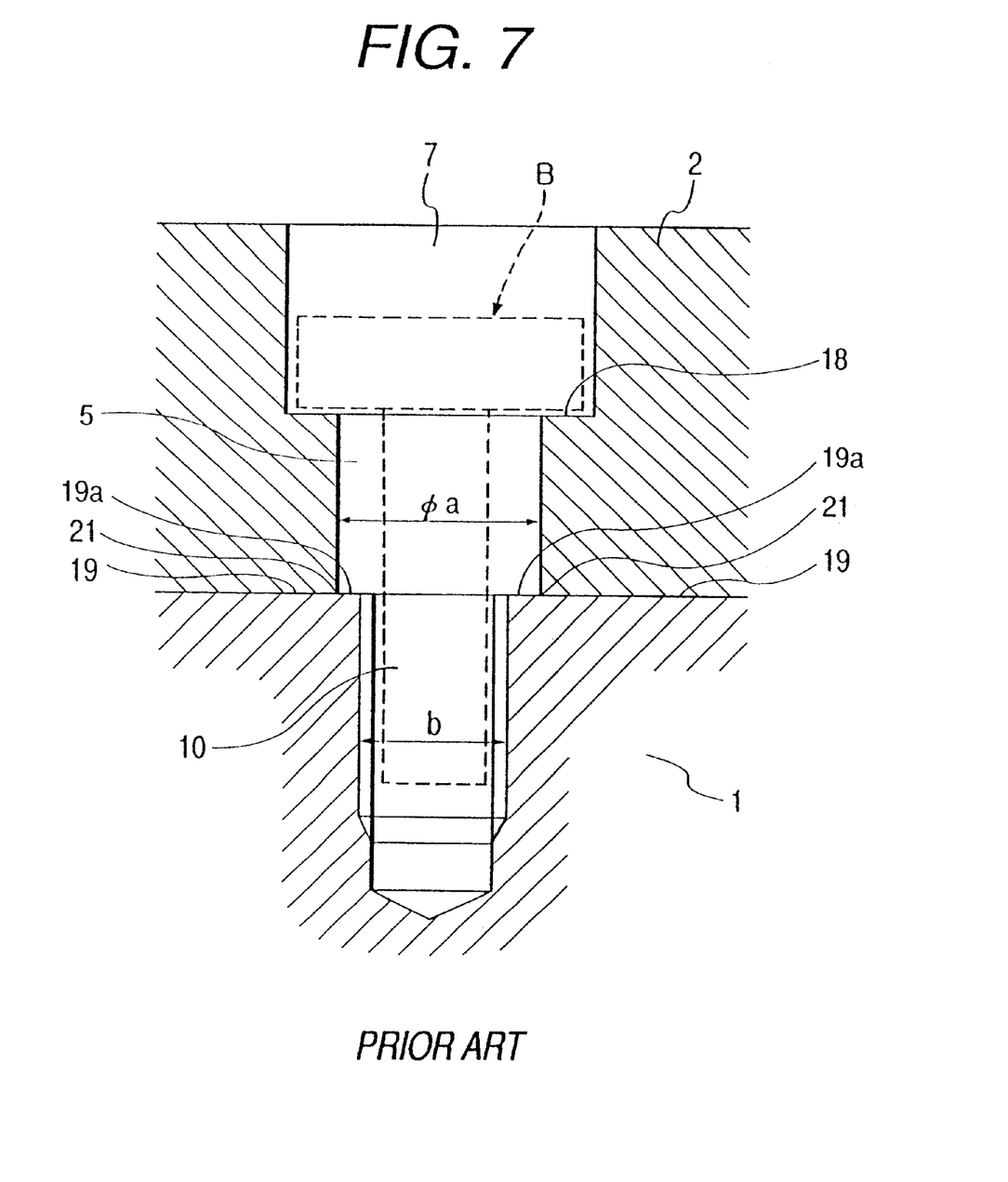
FIG. 7 is a diagram to show the pass hole and the screw hole according to the prior art in the stationary member and the member to be fixed, which are placed in the fastened state.

FIG. 7 is a cross-sectional view of a counterbore, a pass hole, and a screw hole in a stationary member (a base member) and a member to be fixed (a rail) placed in the positional relation in an actually fixed state. In FIG. 7, the rail 2 is provided with a pass hole 5, and a counterbore 7 concentric with the pass hole 5 and continuous therefrom. The pass hole 5 permits a bolt B (shown diagrammatically by a dashed line) to reach the base member, and the counterbore 7 houses the head of the bolt to fix the rail 2 to the base member 1 by an urging force from the bottom surface of the head of the bolt against a surface 18. The base member 1 is provided with a screw hole 10 to be coupled with the bolt, at a predetermined fixing position in an upper surface 19 as a fixing surface for the rail 2.

In the illustrated state, the unrepresented bolt is put through the counterbore 7 and pass hole 5 to be screwed into the screw hole 10 whereby the rail and base member are fixed to each other. In this case, the screw thread in the screw part of the bolt exerts the lifting force on the screw thread of the screw hole and the like upward in the screw hole or toward the upper surface 19 of the base member. This causes protruding deformation of the peripheral part 19a of the screw hole in the upper surface 19 of the base member 1. Since this deformation occurs under the leverage by an opening edge 21 of the pass hole 5 of the rail 2, the deformation is further promoted to larger dimensions.

Figure 8:
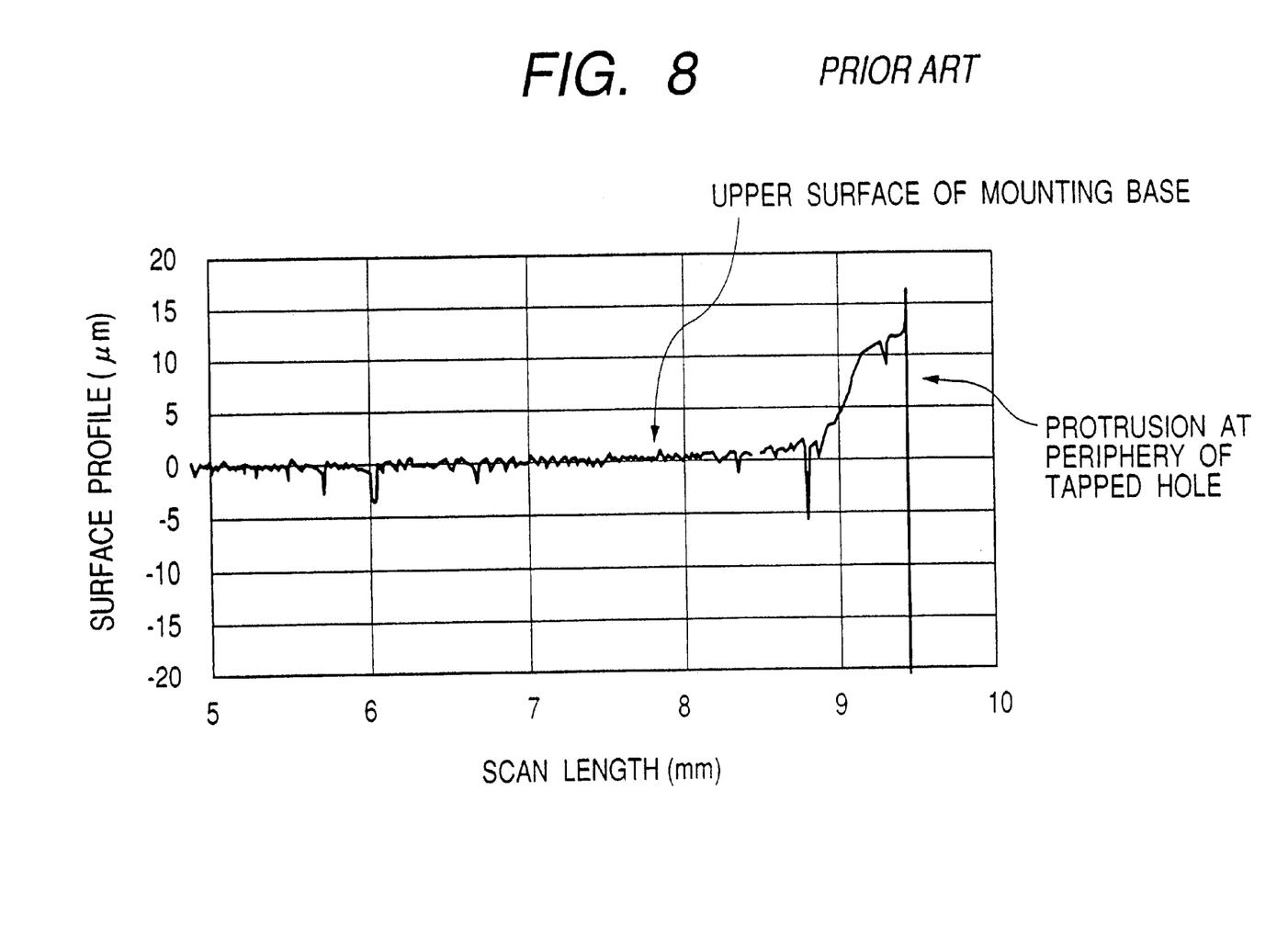
FIG. 8 is a diagram to show the surface profile of the member to be fixed near the screw hole for fixing according to the prior art.

An example of the above deformation is illustrated in FIG. 8. The illustrated example is the result of measurement of a surface profile of the base member under such conditions that the rail for the linear guide bearing was fixed once to the base member with the bolt of M8 and thereafter the bolt and rail were detached. As illustrated, it is apparent that the protrusion of about 10 μm appeared in the region about 0.5 mm wide around the screw hole having the nominal diameter of 8 mm.

When the rail 2 is fixed to the base member 1 in practice, there can be cases wherein the tightening work of bolt is carried out several times and fine adjustment of the fixing position of the rail is repeated before final fixing. However, when the high precision of ten micrometer or less is required, it may be practically impossible to fix the rail at the predetermined position with precision because of a protrusion as described above.

There can also be cases wherein the high position precision of the rail is achieved by only one tightening work of bolt. Even in such cases, however, there were possibilities that the rail had to be dismounted after fixing of the rail and there could arise the problem that it became difficult to fix the rail again at the correct position on that occasion, and the like. Further, there was the problem that this protrusion became greater with increase in the number of tightening works of bolt and the mounting precision degraded with increase of the dismounting and mounting works of the rail.

It was common practice heretofore to carry out the removing work of the protrusion as occasion arose, i.e., when the size of the protrusion posed a practical problem. Such practice involved such problems as the problem that the removing work required a considerable time, the problem that there were cases wherein it was difficult to carry out the removing work, and so on.

SUMMARY OF THE INVENTION

An object of the present invention is to provide a combination that always enables a member to be fixed, such as the rail, to be fixed to a stationary member, such as the base, with high position precision, without need for the aforementioned removing work of the protrusion around the opening of the screw hole.

More specifically, the object is to provide a combination that enables fastening works to be carried out readily, without need for the removing work of the protrusion or the like even in such cases that two or more members are fastened to each other with a bolt or the like and that the fastening works, including mounting, dismounting, etc., are carried out repeatedly using the same screw hole or the like.

For solving the above problems, a stationary member (a stationary member for a linear guide bearing) and a member to be fixed (the linear guide bearing, i.e., a rail in the linear guide bearing) according to the present invention are a stationary member having a screw hole, the screw hole being formed in a fixing surface for fixing of the member to be fixed and being used for fixing the member to be fixed on the fixing surface by being coupled with a bolt passing through a through hole formed in the member to be fixed, and a member to be fixed having the through hole, wherein a shape of the screw hole is defined as follows:

an external edge portion of an opening portion of the screw hole in the fixing surface comprises an annular recess continuous from the screw hole; and when an inside diameter of the through hole is $\phi a$ and a nominal diameter of a female thread of the screw hole is b, a width c of the annular recess indicated by half of a difference between the nominal diameter and an outside diameter of the annular recess in a radial direction of the screw hole satisfies a relation of $0.5\times(\phi a-b) < c \leq 2.0\times(\phi a-b)$.

For also solving the above problems, a stationary member and a member to be fixed according to the present invention are a stationary member having a screw hole, the screw hole being formed in a fixing surface for fixing the member to be fixed and being used for fixing the member to be fixed on the fixing surface by being coupled with a bolt passing through a through hole formed in the member to be fixed, and a member to be fixed having the through hole, wherein a shape of the screw hole is defined as follows:

an external edge portion of an opening portion of the screw hole in the fixing surface comprises an annular recess continuous from the screw hole and concentric with a center axis of the screw hole and an outside diameter of the annular recess satisfies such a relation as to be not less than 1.1 times and not more than 1.4 times a nominal diameter of the screw hole.

Further, the shape of the annular recess in the shape of the screw hole described above can be any shape satisfying the above relation and selected from a taper shape in which the annular recess becomes shallower toward the external edge portion of the annular recess, a shape in which a cross section of the annular recess in a widthwise direction is substantially a part of an arc, a shape in which a bottom surface of the annular recess is parallel to the fixing surface, and combinations thereof.

DETAILED DESCRIPTION OF THE PREFERRED EMBODIMENTS

An object of the present invention is to fix a member to be fixed, to a stationary member having a screw hole, with a bolt with high position precision. In this specification, the present invention will be explained with specific examples of mounting the rail for the linear guide bearing requiring particularly high precision positioning, as in the case described above in the related background art.

It is, however, noted that the present invention imparts no restrictions on the stationary member and the member to be fixed as constituent elements, but the rail described below can also be a ball guide using balls as rolling elements in a cross roller guide, a rail in the cross roller guide, or the like.

Now each of embodiments of the present invention will be described referring to FIG. 1 to FIG. 4. In the following description, like members, like components, etc. in the figures will be denoted by identical reference symbols. In the following figures, the inside diameter of the pass hole 5 is indicated by $\phi a$ and the nominal diameter of the female thread of the screw hole 10 by b.

Figure 1:
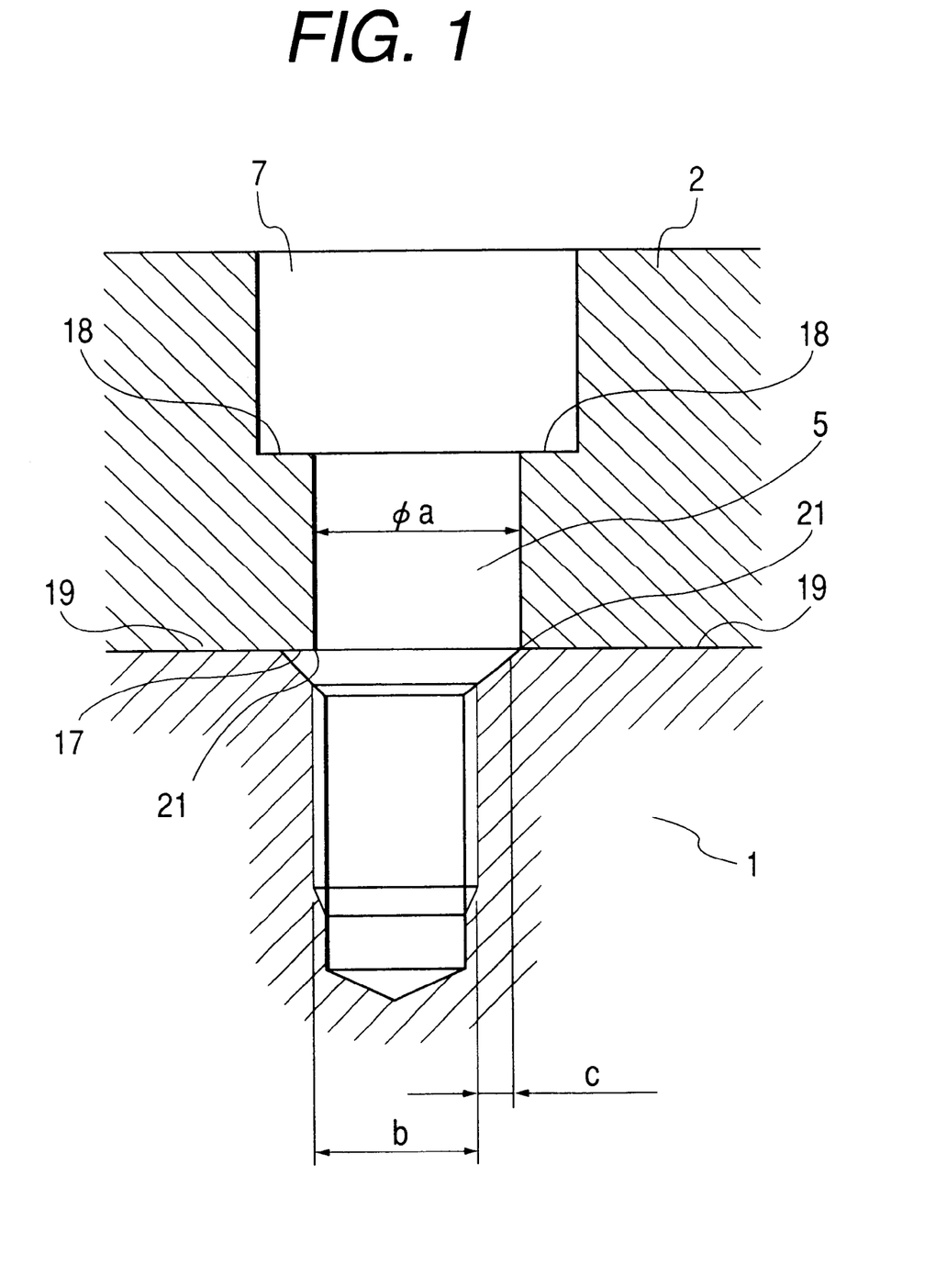
FIG. 1 is a drawing to show a schematic cross section of a pass hole and a screw hole according to the present invention, in a stationary member and a member to be fixed, which are placed in a fastened state.
Figure 2:
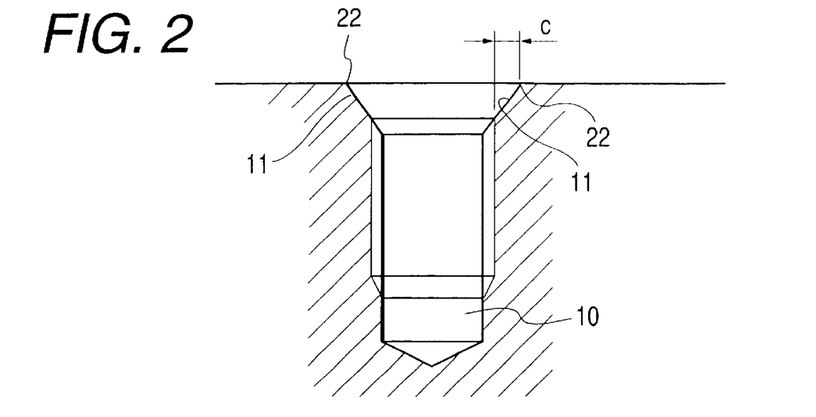
FIG. 2 is a schematic cross-sectional view of a shape of a screw hole, which is a diagram for explaining a shape of an annular recess in the present invention.
Figure 3:
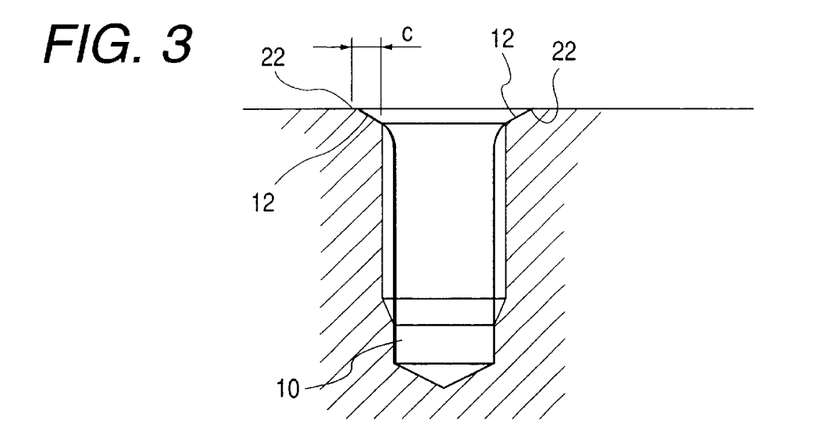
FIG. 3 is a schematic cross-sectional view of a shape of another screw hole, which is a diagram for explaining a shape of another annular recess in the present invention.
Figure 4:
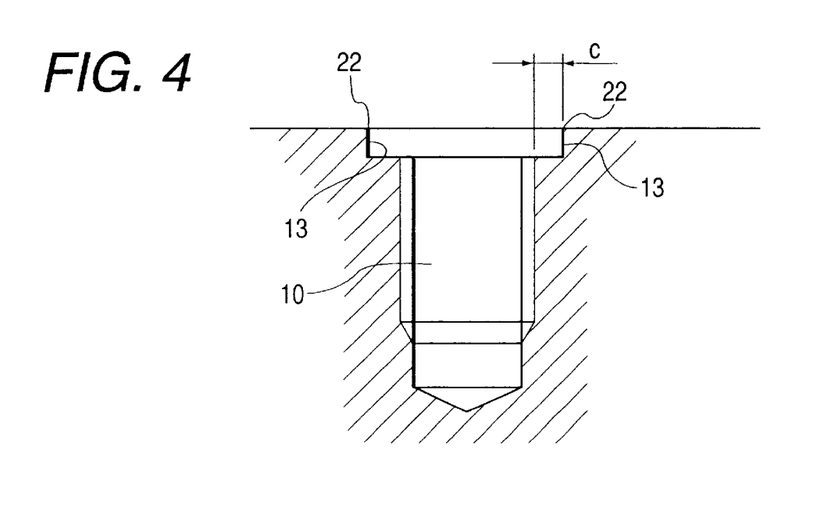
FIG. 4 is a schematic cross-sectional view of a shape of another screw hole, which is a diagram for explaining a shape of still another annular recess in the present invention.

FIGS. 1 and 2 show an example in which the shape of the annular recess is a chamfer shape 11 tapering to with increasing diameter of the opening toward the aperture of the screw hole, FIG. 3 shows an example in which the shape 12 of the annular recess is such that the shape of the opening portion of the screw hole 10 in a cross section of the screw hole 10 along the axis thereof is a convex arc, and FIG. 4 shows an example in which the shape of the annular recess is such that the opening portion of the through hole 10 is further provided with a counterbore portion 13. As will be appreciated from FIG. 1, the contact length of the base 1 with the rail 2 is substantially greater than the maximum diameter of the annular recess (diameter in the plane of surface 19) along a line containing the diameter.

In the figures the letter "c" indicates the region in which the annular recess continuous from the screw hole 10 is formed, i.e., a value (the width of the annular recess) obtained by half of a difference calculated by subtracting the nominal diameter of the female thread of the screw hole 10 from the outside diameter of the annular recess in the radial direction of the screw hole 10. The shapes of the annular recesses illustrated in the figures are just examples of the present invention and can be modified according to the strength of the stationary member and bolt, or their shapes, and so on. For example, the convex arc surface indicated by 12 of FIG. 3 may be replaced by a concave arc surface.

Next, the magnitude of c which is actually effective in each of the embodiments will be discussed. In FIG. 1, the peripheral part of the screw hole 10 of the base member 1 is pulled up toward the rail 2 by the unrepresented bolt and this lifting effect is promoted further by the leverage about the peripheral part 21 of the pass hole 5 in the bottom surface of the rail 2, thereby forming a plastically deformed portion protruding toward the upper surface 19 of the base member 1.

The present invention prevents the protrusion substantially from protruding up from the upper surface 19 of the base member 1, in such a way that the height of the protrusion thus formed is kept within the annular recess formed in the region of the above width C.

The minimum width c of the annular recess for eliminating the influence of the protrusion in mounting of the rail 2 occurs with alignment of the center axis with the screw hole 10 and the pass hole 5, i.e., in the placement illustrated in FIG. 7. This is a case in which, in the upper surface 19 of the rail-mounting base 1, the leverage about the peripheral part 21 acts on the portion on the circumference the distance $(\phi a-b)/2$ apart from the periphery of the screw hole 10. On this occasion, the protrusion appears in the region 19a inside the circumference the distance $(\phi a-b)/2$ apart from the periphery of the screw hole 10.

Therefore, the protrusion can be prevented substantially from appearing above the upper surface 19, by setting the depth of the annular recess to an appropriate value or determining the shape of the annular recess as an appropriate shape and, at the same time, by setting the width c of the annular recess to a value not less than $(\phi a-b)/2$, i.e., by setting the value of $c/(\phi a-b)$ to 0.5 or more.

When the width c of the annular recess is not less than the above value, the occurrence of the protrusion above the upper surface 19 can be prevented effectively. However, at the same time, increase of this value can possibly pose another problem. Namely, during fixing of the rail 2 the bolt applies the tightening force toward the upper surface 19 onto the end face 18 of the counterbore of the rail 2.

In FIG. 1, face 17 is an annular surface in the lower surface of the rail 2, not supported by the upper surface 19 of the base member because of the formation of the annular recess. If the width c of the annular recess is set to a larger value, for example, if (b−2c), such that the inside diameter of the opening of the screw hole 10 is larger than the inside diameter $\phi a$ of the pass hole 5, stress will act so as to bend the portion between the end face 18 and the end face 17 toward the base member 1.

As a result, it is conceivable that the rail 2 could suffer local deformation, for example, deflection or the like and this could cause deformation of the roller grooves formed with very high precision on the rail 2, thereby degrading movement accuracy and operation lifetime of the linear guide bearing. Therefore, the width c of the annular recess has to be determined in such a range as not to cause the above local deformation as possible.

Figure 5:
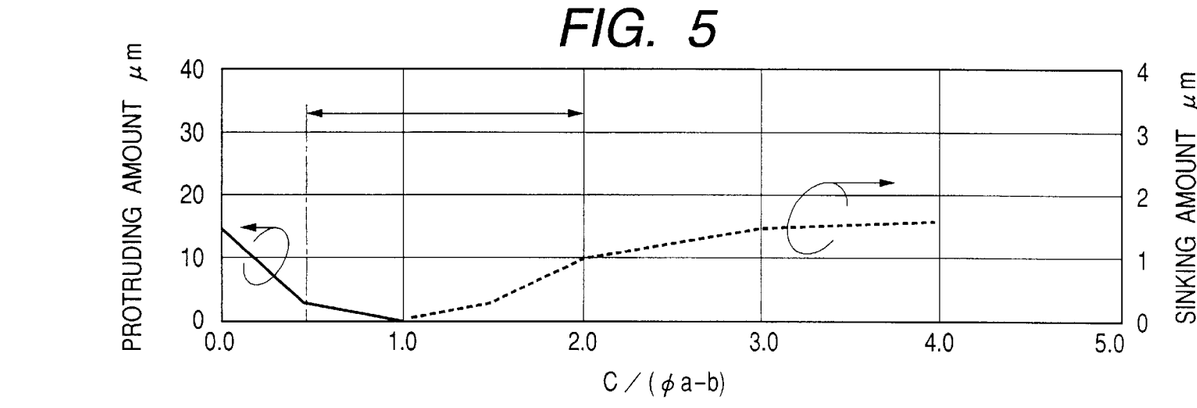
FIG. 5 is a diagram to show the relation of the width of the annular recess in an embodiment of the present invention, versus protruding amount and deformation amount of the roller groove on the rail.
Figure 6:
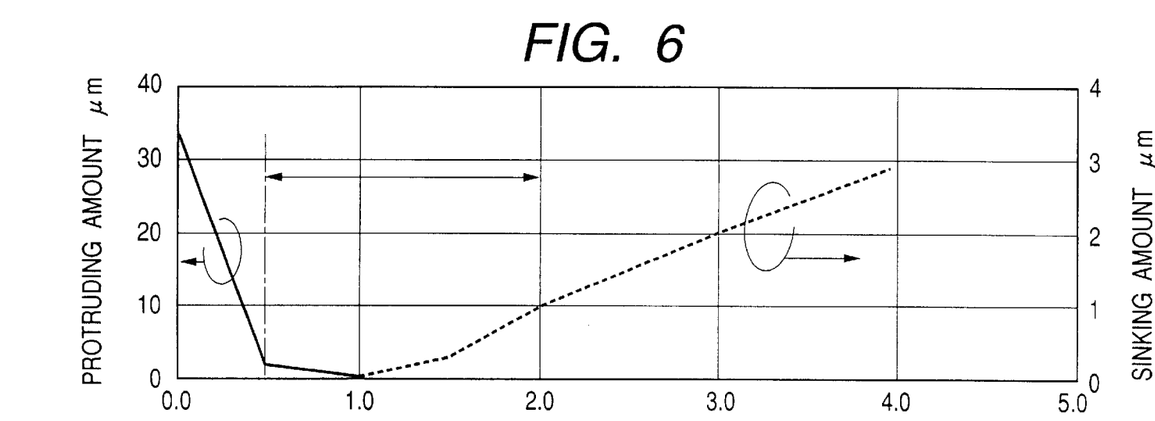
FIG. 6 is a diagram to show the relation of the width of the annular recess in another embodiment of the present invention, versus protruding amount and deformation amount of the roller groove on the rail.

FIGS. 5 and 6 show the results of experiments conducted for obtaining the appropriate range of the value c, taking the factors mentioned in the above discussion into consideration. FIG. 5 shows the results of an actual linear guide bearing wherein b is 8 mm, and shows the relation of $c/(\phi a-b)$ against actual protrusion height (protruding amount) of the deformed portion with respect to the upper surface 19 of the base member 1 and against deformation amount (sinking amount) of the roller groove caused by the deformation of the rail 2. In the drawing the solid line represents protruding amounts while a dotted line sinking amounts. FIG. 6 shows similar relation in the case wherein b is 6 mm.

In either of the illustrated cases, the protruding amounts quickly decrease with increasing $c/(\phi a-b)$ and the protruding amounts are about 3 $\mu$m or less in the aforementioned range of not less than 0.5 thereof, which is a permissible level in fixing of the rail of the linear guide bearing. The deformation amounts of the roller groove increase slightly with increase in $c/(\phi a-b)$. It is desirable to keep the deformation amount not more than 10 $\mu$m, taking the movement accuracy and operation lifetime into consideration. It is thus apparent from FIG. 5 and FIG. 6 that the value of $c/(\phi a-b)$ satisfying these requirements has to be not less than 0.5 and not more than 2.0.

As described above, the protrusion of the peripheral part of the screw hole is plastic deformation of the stationary member occurring because the lifting force applied to the peripheral part of the screw hole by the screw is enhanced by the leverage about the peripheral part of the through hole. In the present invention, the annular recess of width c is provided in the periphery of the screw hole to reduce the leverage about the peripheral part of the through hole and thereby the deformation amount, or the plastic deformation is kept within the annular recess so as to eliminate the substantial influence thereof, thereby enabling the fastening works to be carried out repeatedly with precision.

In fixing of the rail for the linear guide bearing, to great an increase in the width c of the annular recess can cause deformation of the rail guide surface or the roller groove surface and can result in degradation of the movement accuracy, decrease in the lifetime of the apparatus due to occurrence of unexpected internal stress, or the like. For this reason, the maximum was obtained for the width c of the annular recess from the experiments illustrated in above FIGS. 5 and 6 in the present invention.

Incidentally, diameters of through holes for bolts etc. used in fastening of members are specified in Japanese Industrial Standards (JIS). According to the standards, it is determined that the diameter of the through hole is 1.02 to 1.1 times the nominal diameter of the screw in class 1 and that it is 1.1 to 1.3 times the nominal diameter in class 3. Namely, the diameter of the through hole is considered normally to be 1.1 times the nominal diameter of screw. Accordingly, the above value of φa is represented by 1.1b and the value of c/b has to be not less than 0.05 and not more than 0.2. That is to say, the outside diameter of the annular recess can be determined in the range of not less than 1.1 times and not more than 1.4 times the nominal diameter of the screw.

The present invention can prevent occurrence of the protruding portion above the fastening surface in the member, so as to always permit the members to be fixed to each other with high position precision, even in cases of fastening of the members requiring high positioning precision where the tightening work of bolt is carried out several times, or that the members are fixed after repetition of fine adjustment of the fixing position of the rail, and in like cases.

What is claimed is:

1. A mounting structure for mounting a linear guide bearing, said mounting structure comprising a stationary base member and a rail for the linear guide bearing, said stationary base member for the linear guide bearing having a screw hole, said screw hole being formed in a rail fixing surface for fixing of said rail for the linear guide bearing and being used for fixing said tail on said rail fixing surface by being coupled with a bolt passing through a through hole having an inside diameter φa formed in said rail, wherein a shape of said screw hole in defined as follows:

an external edge portion of an opening portion of said screw hole in said fixing surface comprises an annular recess continuous from said screw hole; said screw hole has a nominal diameter b of a female thread of said screw hole; said annular recess has a width c indicated by half of a difference between said nominal diameter and an outside diameter of said annular recess in a radial direction of said screw hole; and said diameter φa, said diameter b, and said width c satisfy the relation $0.5 \times (\phi a - b) < c \leq 2.0 \times (\phi a - b)$.

2. The mounting structure according to claim 1, selected from a taper shape in which the annular recess becomes shallower toward the external edge portion of said annular recess, a shape in which a cross section of said annular recess in a widthwise direction is substantially a part of an arc, a shape in which a bottom surface of said annular recess is parallel to said fixing surface, and combinations thereof.

3. A mounting structure according to claim 1, wherein said stationary base member has said screw hole formed as a blind hole therein.

4. A mounting structure according to claim 1, wherein said rail is formed with a counterbore adjacent to said through hole to receive a head of the bolt.

5. A mounting structure according to claim 1, wherein a contact length of said rail with said stationary base member is substantially greater than a maximum diameter of said annular recess along a line containing said maximum diameter.

6. A mounting structure for mounting a linear guide bearing, said mounting structure comprising a stationary base member and a rail for the linear guide bearing, said stationary base member for the linear guide bearing having a screw hole, said screw hole being formed in a rail fixing surface for fixing of said rail for the linear guide bearing and being used for fixing said rail on said rail fixing surface by being coupled with a bolt passing through a through hole formed in said rail, wherein a shape of said screw hole is defined as follows:

an external edge portion of an opening portion of said screw hole in maid fixing surface comprises an annular recess continuous from said screw hole and concentric with a center axis of said screw hole and an outside diameter of said annular recess satisfies such a relation as to be not less than 1.1 times and not more than 1.4 times a nominal diameter of said screw hole.

7. The mounting structure according to claim 6, wherein the shape of said annular recess is one selected from a taper shape in which the annular recess becomes shallower toward the external edge portion of said annular recess, a shape in which a cross section of said annular recess in a widthwise direction is substantially a part of an arc, a shape in which a bottom surface of said annular recess is parallel to said fixing surface, and combinations thereof.

8. A mounting structure according to claim 6, wherein said stationary base member has said screw hole formed as a blind hole therein.

9. A mounting structure according to claim 6, wherein said rail is formed with a counterbore adjacent to said through hole to receive a head of the bolt.

10. A mounting structure according to claim 6, wherein a contact length of said rail with said stationary base member is substantially greater than a maximum diameter of said annular recess along a line containing said maximum diameter.

* * * * *